(12) United States Patent
Ohyama

(10) Patent No.: US 8,752,973 B2
(45) Date of Patent: Jun. 17, 2014

(54) LIGHTING DEVICE, DISPLAY DEVICE AND TELEVISION RECEIVER

(75) Inventor: Susumu Ohyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 196 days.

(21) Appl. No.: 13/498,407

(22) PCT Filed: Sep. 1, 2010

(86) PCT No.: PCT/JP2010/064883
§ 371 (c)(1),
(2), (4) Date: Mar. 27, 2012

(87) PCT Pub. No.: WO2011/043140
PCT Pub. Date: Apr. 14, 2011

(65) Prior Publication Data
US 2012/0188465 A1 Jul. 26, 2012

(30) Foreign Application Priority Data
Oct. 6, 2009 (JP) .................................. 2009-232568

(51) Int. Cl.
*G09F 13/08* (2006.01)
(52) U.S. Cl.
USPC ........... 362/97.2; 362/602; 362/609; 362/613
(58) Field of Classification Search
USPC ............... 349/58, 60–66; 362/97.2, 602, 609, 362/613; 348/739, E5.133
See application file for complete search history.

(56) References Cited

U.S. PATENT DOCUMENTS

| | | | | |
|---|---|---|---|---|
| 6,882,380 | B2* | 4/2005 | Yu et al. | 349/61 |
| 6,986,598 | B2* | 1/2006 | Chu et al. | 362/561 |
| 7,029,158 | B2* | 4/2006 | Yang | 362/600 |
| 7,154,570 | B2* | 12/2006 | Lee | 349/58 |
| 7,738,054 | B2* | 6/2010 | Okumura et al. | 349/68 |
| 7,766,534 | B2* | 8/2010 | Iwasaki | 362/632 |
| 8,436,962 | B2* | 5/2013 | Ajichi et al. | 349/64 |

(Continued)

FOREIGN PATENT DOCUMENTS

| JP | 2002-184224 A | 6/2002 |
|---|---|---|
| JP | 2004-118207 A | 4/2004 |

(Continued)

OTHER PUBLICATIONS

Official Communication issued in International Patent Application No. PCT/JP2010/064883, mailed on Oct. 26, 2010.

*Primary Examiner* — John A Ward
(74) *Attorney, Agent, or Firm* — Keating & Bennett, LLP

(57) ABSTRACT

A thickness of a backlight unit is reduced and brightness in a middle portion of a display device is improved. The backlight unit includes a first LED unit 23; a first light guide plate 20 including a light entering surface 20b, and a light exiting surface 20a; and a second light guide plate 21 including a light entering surface 21b, and a light exiting surface 21a. The light exiting surface 21a of the second light guide plate 21 is disposed to overlap at least a portion F of the light existing surface 20a of the first light guide plate 20 that is farthest from the first LED unit 23. Light outputted from the light exiting surface 21a of the second light guide plate 21 enters the first light guide plate 20 at least through a surface of the first light guide plate 20 opposite to the light exiting surface 20a thereof.

11 Claims, 10 Drawing Sheets

(56) References Cited

U.S. PATENT DOCUMENTS

| | | | |
|---|---|---|---|
| 8,582,055 B2* | 11/2013 | Kawai et al. | 349/65 |
| 2004/0135936 A1* | 7/2004 | Lee | 349/64 |
| 2004/0246402 A1* | 12/2004 | Yu et al. | 349/61 |
| 2008/0304288 A1 | 12/2008 | Iwasaki | |
| 2009/0086507 A1* | 4/2009 | Iwasaki | 362/613 |
| 2010/0214491 A1 | 8/2010 | Kuromizu et al. | |

FOREIGN PATENT DOCUMENTS

| | | |
|---|---|---|
| JP | 2005-184147 A | 7/2005 |
| JP | 2008-77946 A | 4/2008 |
| JP | 2008-305713 A | 12/2008 |
| JP | 2009-99446 A | 5/2009 |
| WO | 2008/142877 A1 | 11/2008 |

\* cited by examiner

FIG.1
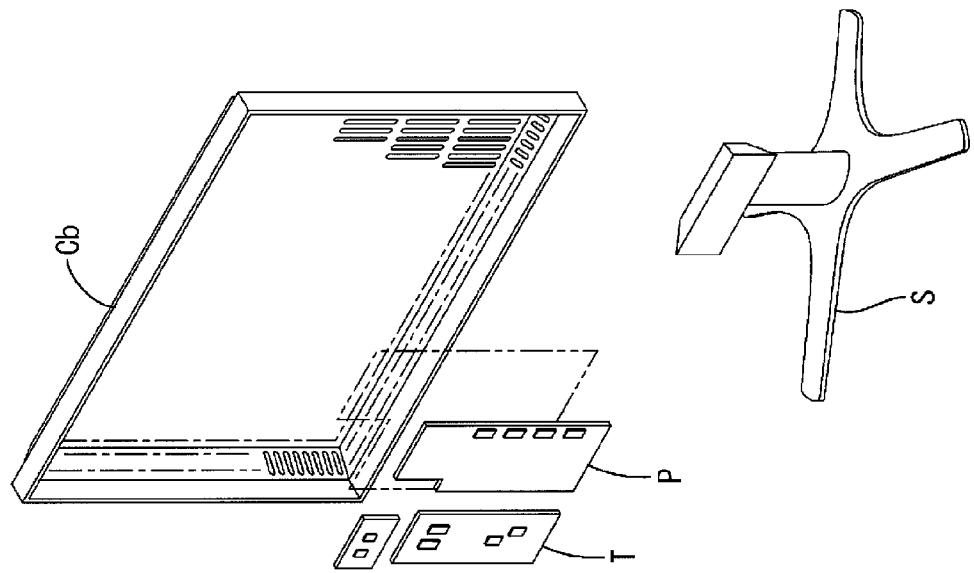
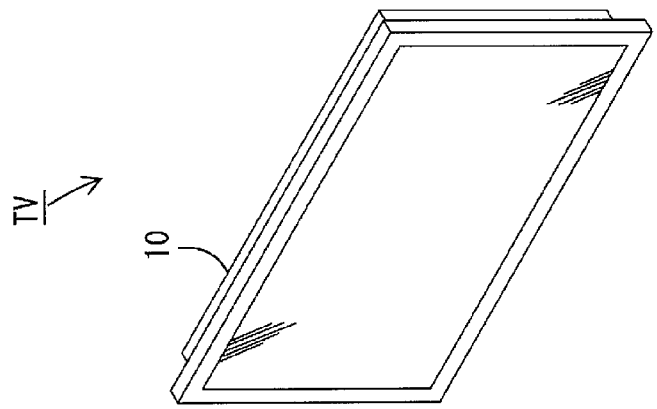
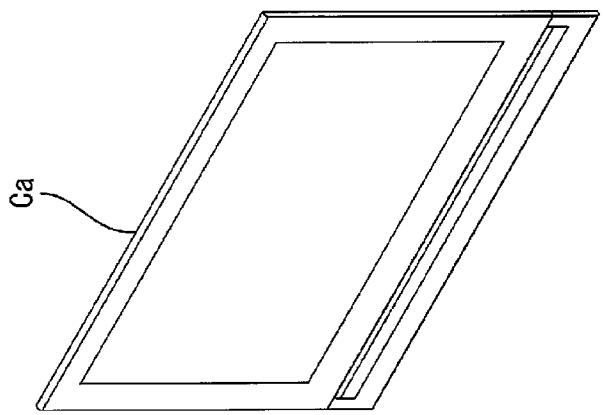

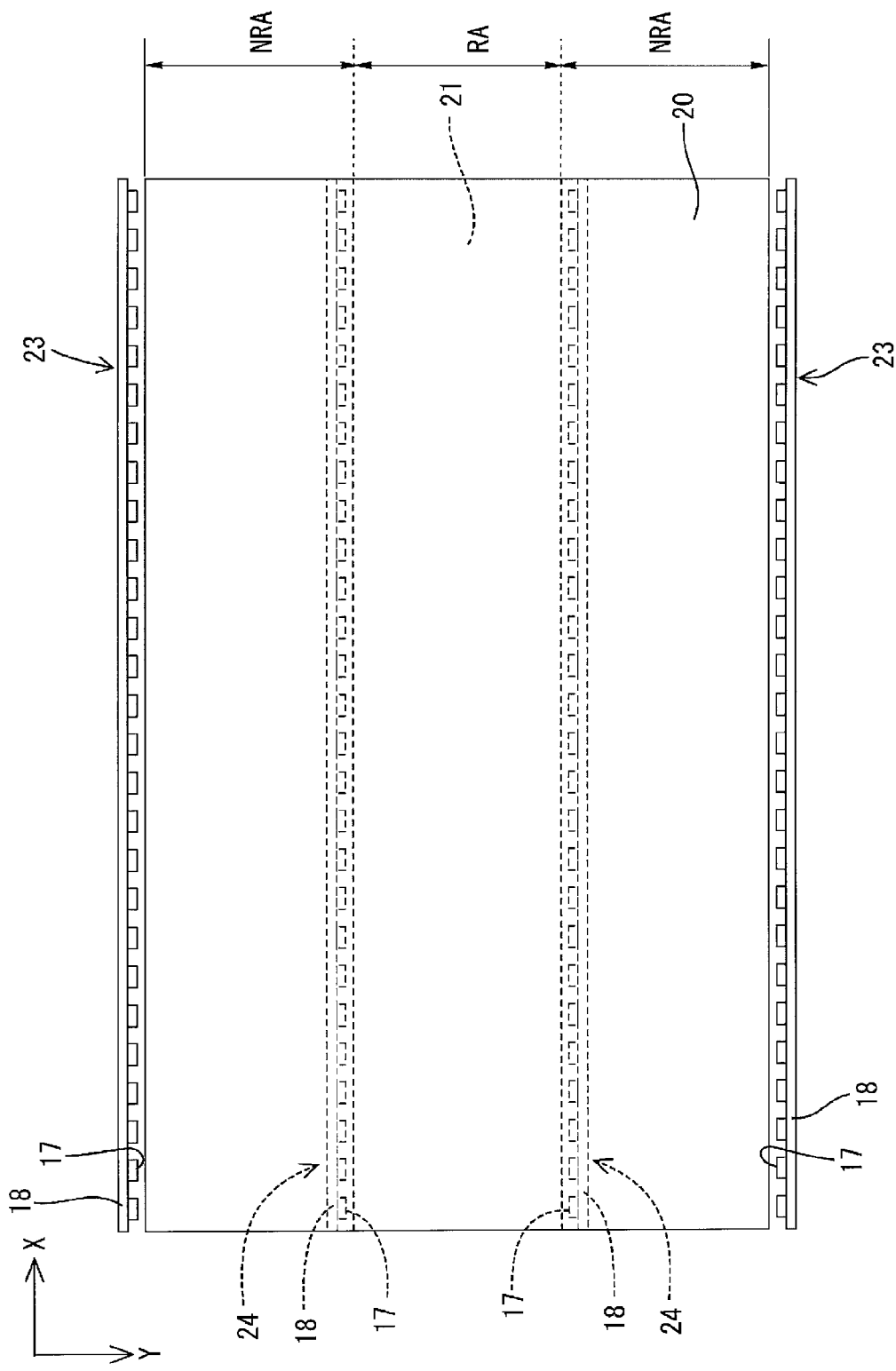

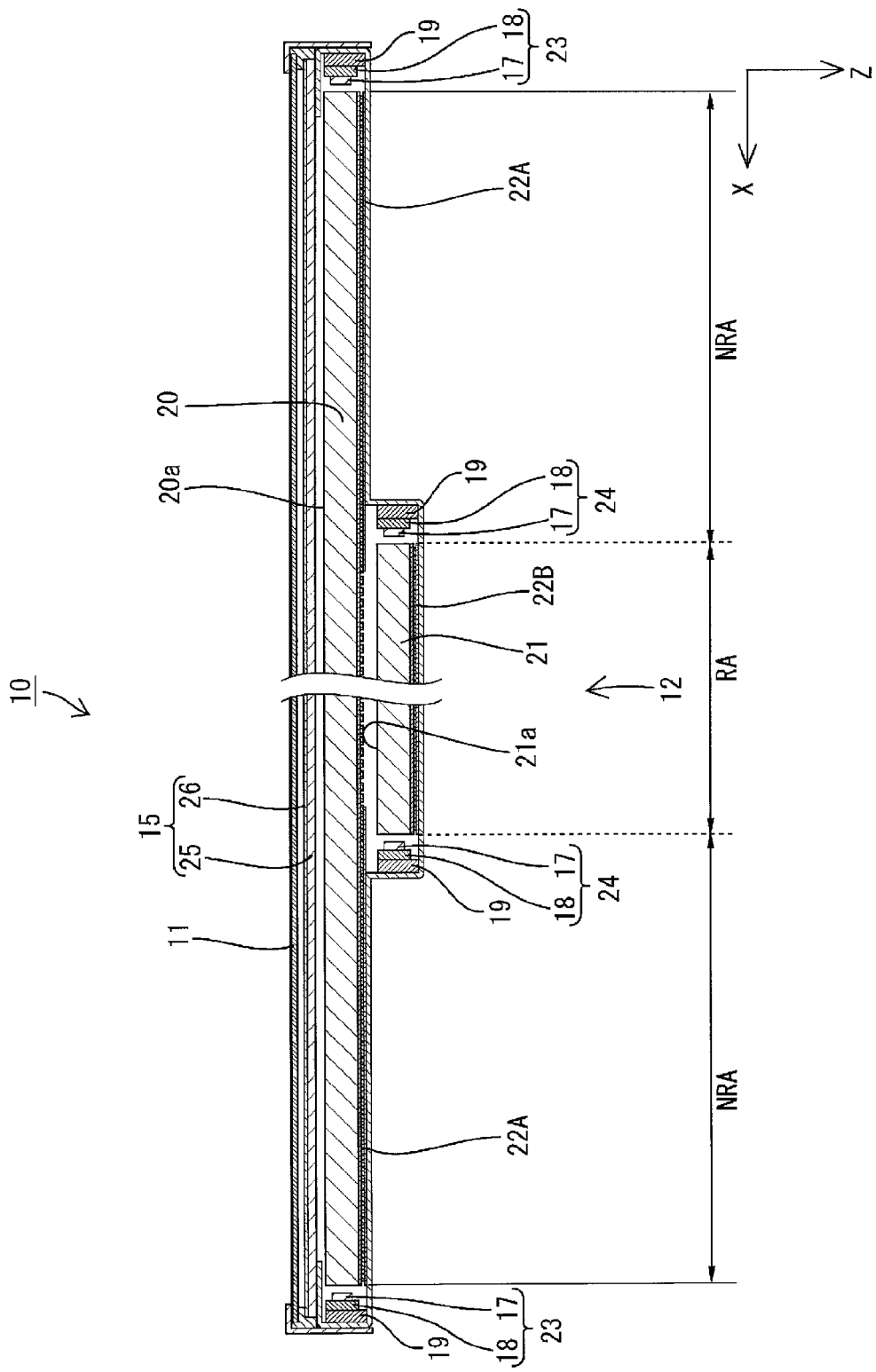

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel used in, for example, a liquid crystal display device such as a liquid crystal television set does not emit light, and therefore requires a backlight unit separately. The backlight unit required is to be installed on the back side (side opposite to the display surface) of a liquid crystal panel, and includes: a chassis having an open surface on the liquid crystal panel side; a light source housed inside the chassis; and optical members (such as a diffuser sheet) arranged in the opening of the chassis and used for effectively irradiating, toward the liquid crystal panel, light emitted by the light source. Additionally, the backlight unit is made thin by using a light guide plate, which has a light entering surface and a light exiting surface, and by providing the light source on the light entering surface provided on an end section of the light guide plate. One known example disclosing this kind of backlight unit is one described in Patent Document 1 below.

In the backlight unit described in Patent Document 1, the light guide plate includes two light guide plates: a first light guide plate and a second light guide plate. The light guide plate has a configuration where the first light guide plate and the second light guide plate are placed over each other with the light exiting surfaces of the first and second light guide plates being set along the same direction and with the light entering surfaces of the first and second light guide plates being set facing each other, and the light sources are placed in positions relatively close to the respective light entering surfaces. Note that Patent Document 1 assumes that a direction taken by light exiting from a general light guide plate forms an angle of about 60 to 70 degrees with a direction along the normal line of the light exiting surface of the light guide plate. This structure has the light exiting surfaces of the first and second light guide plates placed so as to face each other, and thereby makes it possible to obtain a backlight unit from which light exits in two directions.

Patent Document 1: Japanese Unexamined Patent Publication No. 2008-77946

Problem to be Solved by the Invention

However, with the above described structure, two directions along which light exits are obtained. However, such a structure is not suitable for the purpose of improving brightness on the front side in the central portion of the screen of a liquid crystal display device. Particularly, as the panels of liquid crystal display devices increase in size, a demand for techniques to improve brightness on the front side increases.

Disclosure of the Present Invention

The present invention was made in view of the foregoing circumstances, and aims at configuring a thinner backlight unit and improving brightness in the central portion of a display device.

Means for Solving the Problem

A lighting device according to the present invention includes: a first light source; a first light guide member including a light entering surface through which light emitted from the first light source enters, and a light exiting surface through which the light exits; a second light source; and a second light guide member including a light entering surface through which light emitted from the second light source enters, and a light exiting surface through which the light exits. The light exiting surface of the second light guide member is disposed to overlap at least a portion of the light existing surface of the first light guide member that is farthest from the first light source such that light outputted from the light exiting surface of the second light guide member enters the first light guide member at least from a surface of the first light guide member that is opposite to the light exiting surface thereof.

The brightness on a light exiting surface of a light guide body decreases as is farther away from a light source. To supplement this, according to the present invention, the second light guide member is provided independently from the first light guide member and provided with the second light source. The second light guide member is disposed to overlap a portion of the light exiting surface of the first light guide member that is farthest from the first light source. Accordingly, insufficient brightness of the portion of the first light guide member that is farthest from the first light source is covered by the light exiting from the second light guide member.

BRIEF DESCRIPTION OF THE DRAWINGS

FIG. 1 is an exploded perspective view showing a configuration of a television receiver according to a first embodiment of the present invention;

FIG. 9 is a plan view showing a layout of LEDs and light guide plates, which are included in a liquid crystal display device according to a first modification of the second embodiment; and FIG. 10 is a cross-sectional view showing a sectional configuration of the liquid crystal display device according to the first modification of the second embodiment taken along a short side direction thereof.

BEST MODE FOR CARRYING OUT THE INVENTION

First Embodiment

The first embodiment of the present invention is described with reference to FIGS. 1 to 6. Firstly, the configuration of a television receiver TV that includes a liquid crystal display device 10 is described.

Figure 2:
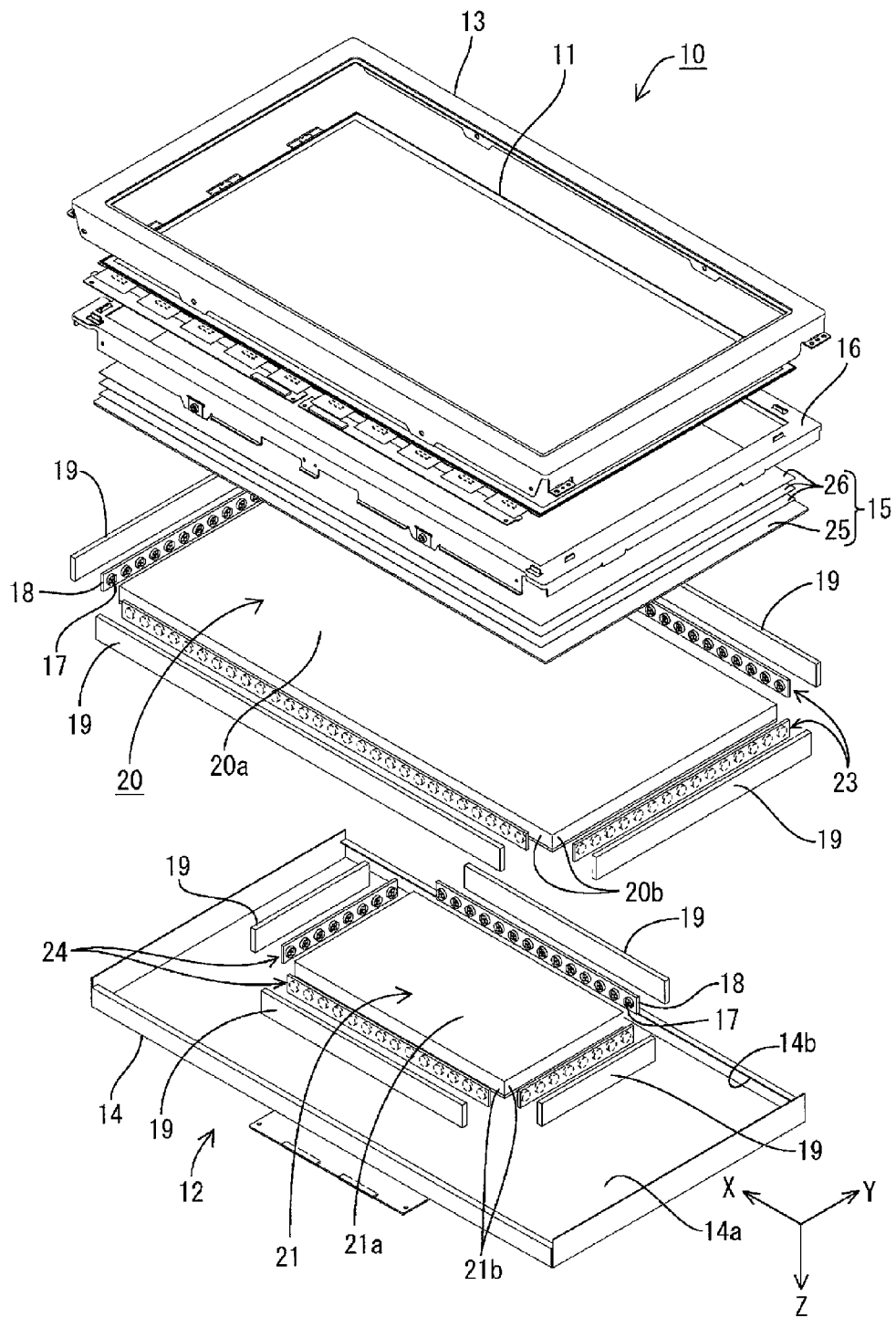
FIG. 2 is an exploded perspective view showing a schematic configuration of the liquid crystal display device included in the television receiver.
Figure 3:
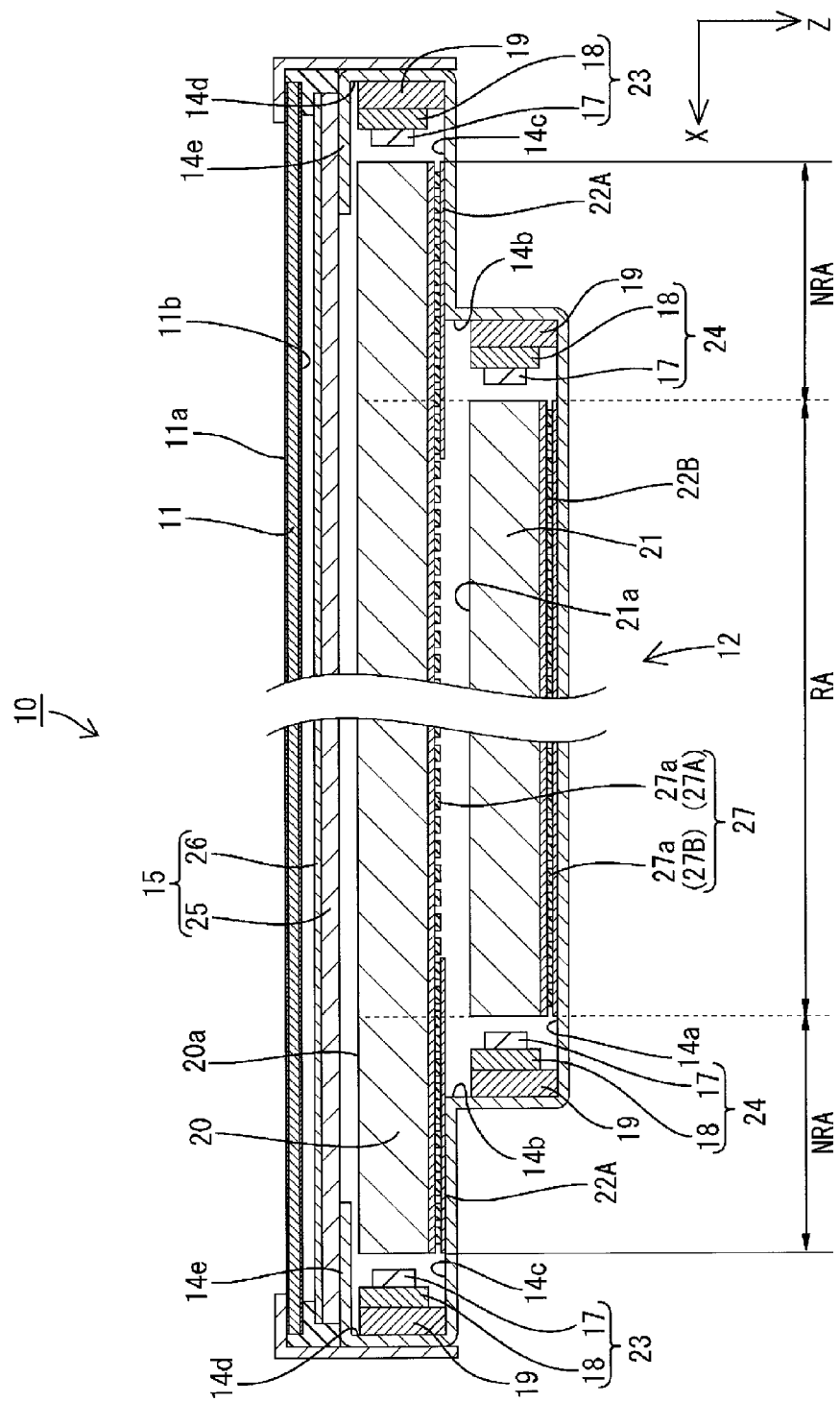
FIG. 3 is a cross-sectional view showing a sectional configuration of the liquid crystal display device taken along a short side direction thereof.
Figure 4:
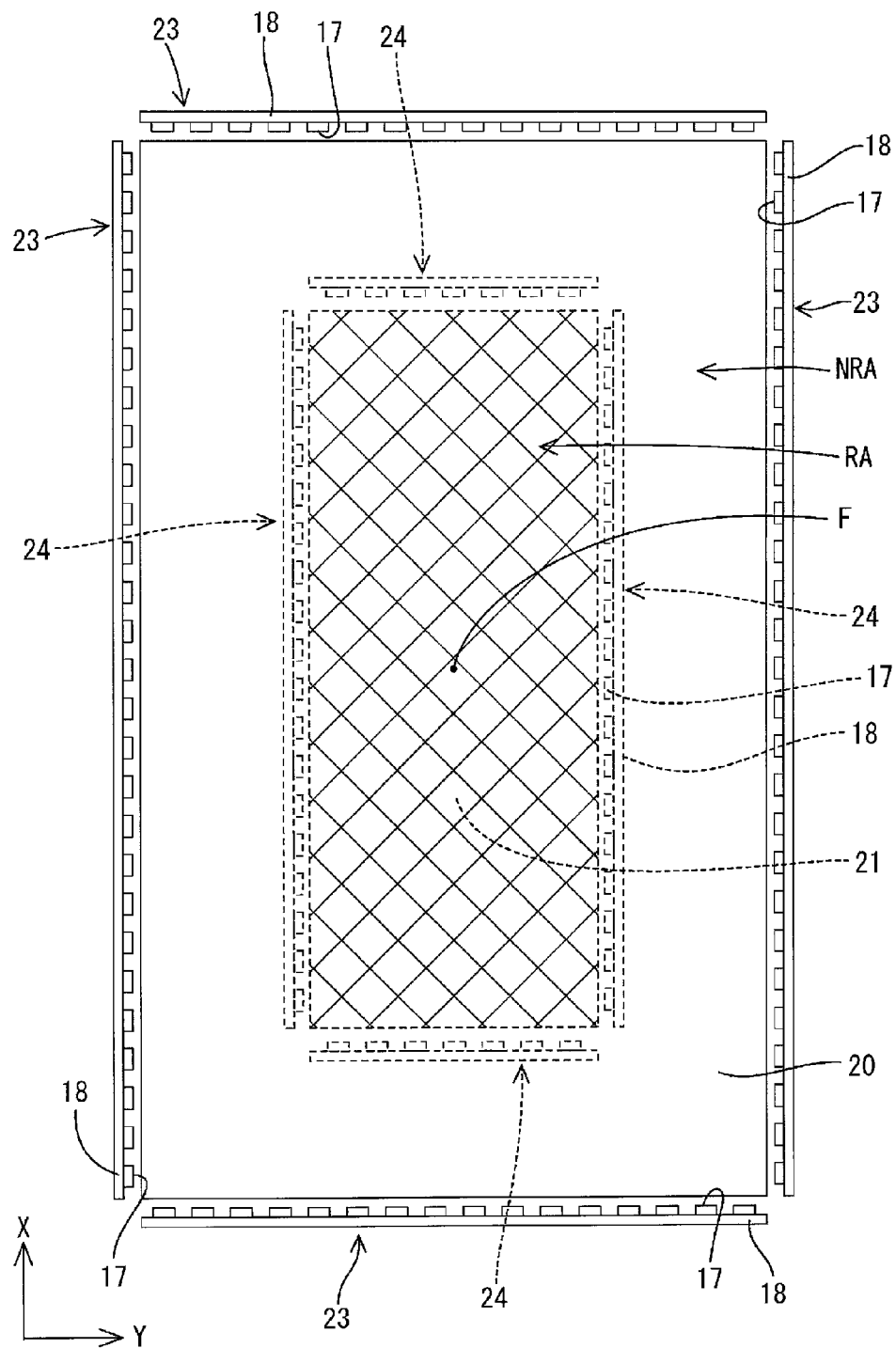
FIG. 4 is a plan view showing a layout of LEDs and light guide plates, which are included in the liquid crystal display device.
Figure 5:
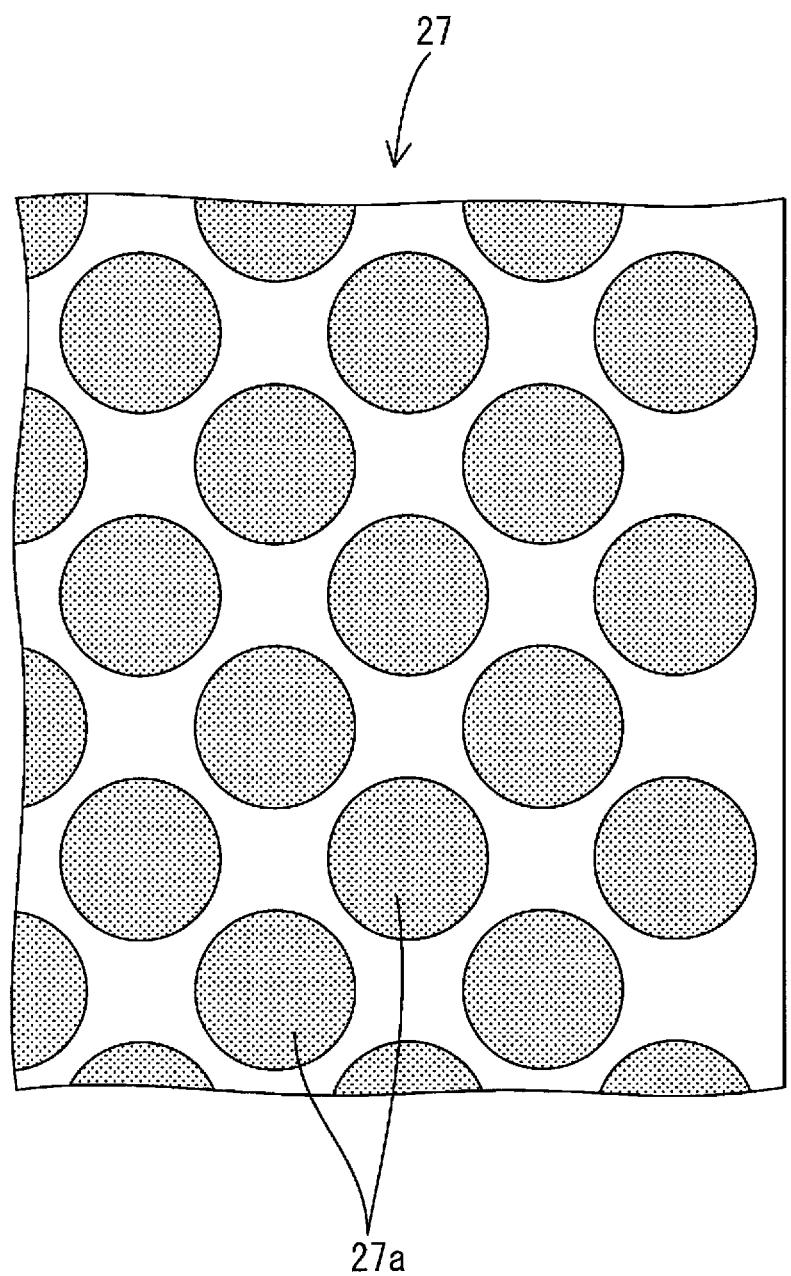
FIG. 5 is a plan view showing a schematic configuration of a surface of a light guide plate included in the backlight unit by enlarging a main part thereof, the surface facing the light exiting surface of the light guide plate.
Figure 6:
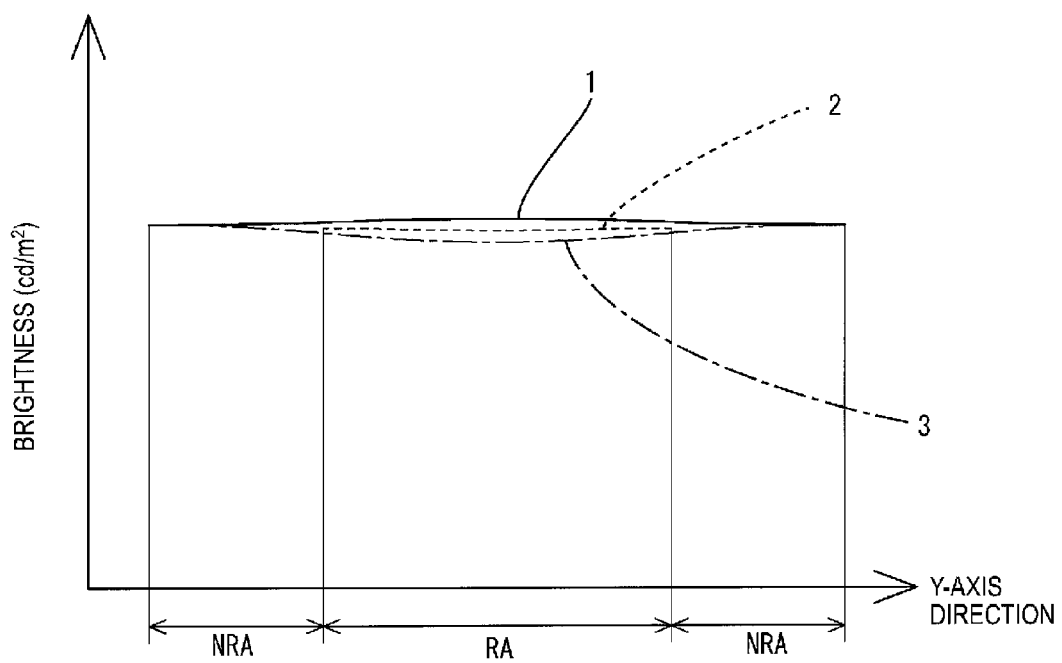
FIG. 6 is a graph schematically showing the distribution of brightness of light exiting solely from a first light guide plate, the distribution of brightness of light exiting solely from a second light guide plate, and the distribution of brightness of light exiting from a combination of the first and second light guide plates placed over each other.

FIG. 1 is an exploded perspective view showing a schematic configuration of the television receiver according to this embodiment; FIG. 2 is an exploded perspective view showing a schematic configuration of the liquid crystal display device included in the television receiver shown in FIG. 1; FIG. 3 is a cross-sectional view showing a sectional configuration of the liquid crystal display device shown in FIG. 2, taken along a short side direction thereof; FIG. 4 is a plan view showing a layout of LEDs and light guide plates, which are included in the liquid crystal display device; FIG. 5 is a plan view showing a schematic configuration of a surface in the light guide plates included in the backlight unit by enlarging the main part thereof, the surface facing the light exiting surface in the light guide plate; and FIG. 6 is a graph schematically showing the distribution of brightness of light exiting solely from a first light guide plate, the distribution of brightness of light exiting solely from a second light guide plate, and the distribution of brightness of light exiting from a combination of the first and second light guide plates placed over each other. Note that, in the following description, the upward side in FIG. 3 corresponds to the frontward side (the optical member side), the downward side therein corresponds to the backward (the chassis side), an upward and downward direction therein, i.e., a direction orthogonal to the plate surfaces of the optical members, corresponds to the Z-axis direction, and directions parallel to the long sides of a first light guide body and parallel to the short sides thereof in FIG. 4 correspond to the X-axis direction and the Y-axis direction, respectively.

As shown in FIG. 1, the television receiver TV according to this embodiment includes: the liquid crystal display device 10; front and back cabinets Ca and Cb between which the liquid crystal display device 10 is sandwiched and housed; a power supply P; a tuner T; and a stand S. The liquid crystal display device (a display device) 10 as a whole has a horizontally-long quadrangular shape (a rectangular shape), and is housed in a stand-up state. As shown in FIG. 2, this liquid crystal display device 10 includes a liquid crystal panel 11 that is a display panel, and a backlight unit (a lighting device) 12 which is an external light source. These components are integrally held by a frame-like bezel 13 and the like. This embodiment shows, as an example, the liquid crystal display device 10 having a screen size of 32 inches and an aspect ratio of 16:9, more specifically, a screen with a horizontal size (a size in the X-axis direction) of, for example, about 698 mm, and a vertical size (a size in the Y-axis direction) of, for example, about 392 mm.

Next, the liquid crystal panel 11 and the backlight unit 12, which constitute the liquid crystal display device 10, are described.

The liquid crystal panel (the display panel) 11 has a configuration where a pair of glass substrates is joined to each other with a predetermined gap and a liquid crystal is enclosed therebetween. One of the glass substrates is provided with: switching elements (e.g., TFTs) each connected to a source line and a gate line which are orthogonal to each other; pixel electrodes connected to these switching elements; an alignment film; and the like. On the other hand, the other glass substrate is provided with: a color filter on which color sections each corresponding to R (red), G (green), B (blue) or the like are arranged in a predetermined array; a counter electrode; an alignment film; and the like. Note that, as shown in FIG. 3, polarizing plates 11a and 11b are arranged on the outer sides of the two substrates.

As shown in FIG. 2, the backlight unit 12 includes: a chassis 14 having a substantially box-like shape having an opening 14b in one side thereof and opening toward the light exiting surface (toward the liquid crystal panel 11); a group of optical members 15 (a diffuser plate (a light diffusion member) 25, and plural optical sheets 26 arranged between the diffuser plate 25 and the liquid crystal panel 11) arranged to cover the opening 14b of the chassis 14; and a frame 16 arranged along the circumference of the chassis 14, and configured to hold outer marginal sections of the group of optical members 15 with these outer marginal sections interposed between the frame 16 and the chassis 14. Further, the chassis 14 is internally provided with: LEDs 17, which are light sources; LED boards 18 each having the LEDs 17 in great number; and heat dissipation members 19 used for facilitating dissipation of heat produced with light emission of the LEDs 17. In addition, the chassis 14 is internally provided with a first light guide plate 20 and a second light guide plate 21 used as large and small light guide bodies, respectively, which guide, toward the optical members 15, light emitted from the LEDs 17. Therein, the first light guide plate 20 sized larger and the second light guide plate 21 sized smaller are placed, respectively, on each other in frontward and backward positions in the Z-axis direction. While the respective light guide plates 20 and 21 are arranged directly under the optical members 15 (the liquid crystal panel 11), the LEDs 17 and the LED boards 18 are arranged on side end sections of the light guide plates 20 and 21. That is, a direction (the X-axis direction or the Y-axis direction) along which the LEDs 17 and the light guide plates 20 and 21 are aligned with each other is orthogonal to a direction (the Z-axis direction) along which the light guide plates 20 and 21 and the optical member 15 are aligned with each other. Reflection sheets 22A and 22B each configured to reflect light are arranged on the backward sides of the respective light guide plates 20 and 21. Further, the heat dissipation members 19 are arranged respectively between the LED boards 18, which are arranged on the side end sections of the light guide plates 20 and 21, and the chassis 14. Note that, in the following description, while the LEDs 17 and the LED boards 18 that are arranged for the first light guide plate 20 are referred to as a first LED unit 23, the LEDs 17 and the LED boards 18 that are arranged for the second light guide plate 21 are referred to as a second LED unit 24.

The chassis 14 is made of, for example, a metal such as an aluminum-based material. As shown in FIG. 3, the chassis 14 has a substantially box-like shape which is open frontward, and is configured to house the light guide plates 20 and 21 and the LED units 23 and 24. Specifically, the chassis 14 includes: a bottom panel 14a having a rectangular shape in a plan view; and two pairs of side panels 14b rising frontward from the outer rims of the two long sides and the two short sides, respectively, of the bottom panel 14a. The bottom panel 14a in a plan view is sized so as to house the second light guide plate 21, the second LED units 24 and the heat dissipation members 19. The heat dissipation members 19 that are mounted on the second LED units 24 are attached to the inner surfaces of the respective side panels 14b. Further, the chassis 14 includes: receiving panels 14c overhanging outwardly from rising end sections of the respective side panels 14b; second side panels 14d rising frontward from the outer rims of the receiving panels 14c; and projecting panels 14e projecting inward from rising end sections of the second side panels 14d. The receiving panels 14c in a plan view are sized so as to house the first light guide plate 20, the first LED units 23 and the heat dissipation members 19. The receiving panels 14c have a frame-like shape in a plan view, and is configured to support a frame-like outer circumferential end section of the first light guide plate 20 from the backward side thereof by a predetermined range. The first light guide plate 20 is thereby maintained, in a state of facing the second light guide plate 21, at a position with a predetermined gap in the Z-axis direction. Additionally, the heat dissipation members 19 that are mounted on the first LED units 23 are attached to the inner surfaces of the respective second side panels 14d. Further, the projecting panels 14e have an outer end section of the optical members 15 placed thereon so as to be able to receive this outer end section from the backward side thereof. Additionally, power supply circuit boards that supply power to the respective LED units 23 and 24 are attached to the backward side of the bottom panel 14a.

As shown in FIG. 3, the optical members 15 have a horizontally-long quadrangular shape (a rectangular shape) in a plan view like the liquid crystal panel 11 and the chassis 14. The optical members 15 are interposed between the liquid crystal panel 11 and the first light guide plate 20, and include the diffuser plate 25 and the optical sheets 26. The diffuser plate 25 is arranged on the backward side (toward the first light guide plate 20; on the side facing the light emitting side). The optical sheets 26 are arranged on the frontward side (toward the liquid crystal panel 11; on the light emitting side). The diffuser plate 25 has a configuration where a large number of diffusing particles are dispersed in a substantially transparent base substrate made of resin and having a predetermined thickness, and has the function of diffusing light guided by the first light guide plate 20. The optical sheets 26 have a sheet-like shape having a plate thickness thinner than that of the diffuser plate 25, and has three layers arranged by being laminated together. Specifically, the optical sheets 26 are a diffuser sheet, a lens sheet, and a reflection type polarizing sheet in the order from the diffuser plate 25 (from the backward side).

The LEDs 17 are so-called surface-mount type LEDs, which means that the LEDs 17 are surface-mounted on the LED boards 18. The LEDs 17 are arrayed side by side on the upward surfaces of the LED boards 18. Each of the LEDs 17 has a configuration where an LED chip is sealed up, with a resin material, on a substrate section to be fixed to the LED board 18. The LED chips mounted on the substrate section are of three kinds which emit light having different dominant wavelengths. Specifically, each of the LED chips emits light of a single color: R (red), G (green) or B (blue). The LED chips as a whole emit white light. Each of the LEDs 17 is of a top-emission type, and its surface opposite to the surface mounted on the LED board 18 serves as a light emitting surface. The LEDs 17 are arranged with the light emitting surfaces thereof facing the outward end surfaces of the light guide plates 20 and 21. The optical axes of the LEDs 17 that are arranged side by side in the short side direction of the light guide plates 20 and 21 are oriented substantially in the X-axis direction. Whereas, the optical axes of the LEDs 17 that are arranged side by side in the long side direction of the light guide plates 20 and 21 are oriented substantially in the Y-axis direction.

The LED boards 18 have forms extending along the outer rims of the light guide plates 20 and 21, and the main plate surfaces (surfaces having the LEDs 17 mounted thereon) thereof run parallel to the outward end surfaces of the light guide plates 20 and 21, and the inner surfaces of the side panels 14b and 14d of the chassis 14. While the lengths of the LED boards 18 are sized substantially the same as the long sides or short sides of the light guide plates 20 and 21, the widths thereof are sized substantially the same as the thickness of the light guide plates 20 and 21. A base member of each of the LED boards 18 is made of, as in the case of the chassis 14, a metal such as aluminum-based material, and has a structure where, on a surface thereof, a wiring pattern made of a metal film using copper foil or the like with an insulating layer interposed between the surface and the wiring pattern is formed. Note that an insulating material such as ceramic may alternatively be used as a material used for the base member of the LED board 18.

The first LED units 23 are arranged so as to surround the first light guide plate 20 having a rectangular shape in a plan view, and are arranged in two pairs of the first LED units 23. Two first LED units 23 of each pair face each other. One of the two pairs corresponds to the long sides of the first light guide plate 20, and the another one of the two pairs corresponds to the short sides thereof. Likewise, the second LED units 24 are arranged so as to surround the second light guide plate 21 having a rectangular shape in a plan view, and are arranged in two pairs of the second LED units 24. Two second LED units 24 of each pair faces each other. One of the two pairs corresponds to the long sides of the second light guide plate 21, and the another one of the two pairs corresponds to the short sides thereof. Since the second light guide plate 21 is smaller than the first light guide plate 20 in a plan view, the LED boards 18 constituting the second LED units 24 along the respective long and short sides of the second light guide plate 21 are shorter in length and smaller in number of the LEDs 17 mounted thereon than the LED boards 18 constituting the first LED units 23 along the respective long and short sides of the first light guide plate 20.

As shown in FIGS. 2 and 3, the heat dissipation members 19 are made of a synthetic resin material or metallic material that is higher in thermal conductivity than at least the base member of the LED boards 18 and, as a whole, have a plate-like shape running parallel to the LED boards 18. The heat dissipation members 19 are arranged so as to be respectively interposed between the LED boards 18 constituting the LED units 23 and 24, and the side panels 14b and 14d of the chassis 14. This arrangement enables efficient transfer of heat produced by the LEDs 17 to the chassis 14, thereby facilitating heat dissipation from the LEDs 17.

The first light guide plate 20 and the second light guide plate 21 are made of resin, such as acrylic resin, that is sufficiently higher in refractivity than air and is highly transparent, each of which is, like the optical members 15, formed in a plate-like shape rectangular in a plan view and having a predetermined thickness. The light guide plates 20 and 21 have a function of introducing therein light emitted from the LEDs 17 in the vertical direction (the Y-axis direction) or in the horizontal direction (the X-axis direction) and outputting the light by causing the light to internally diffuse and also to go up toward the optical members 15 (in the Z-axis direction). A dimensional ratio of the long sides and the short sides of the first light guide plate 20, and a dimensional ratio of the long sides and the short sides of the second light guide plate 21 are set to, for example, 16:9, which is substantially equal to those of the liquid crystal panel 11 and the optical members 15.

As shown in FIGS. 3 and 4, the first light guide plate 20 is arranged between the two first LED units 23 of each of the two pairs that are arranged so as to face each other The first light guide plate 20 is arranged with the main plate surface thereof facing frontward, i.e., toward the diffuser plate 25. This main plate surface is configured as a light exiting surface 20a through which light inside the first light guide plate 20 is outputted toward the optical members 15 and the liquid crystal panel 11. The light exiting surface 20a is configured as a surface extending along and parallel to the display surface of the liquid crystal panel 11. On the other hand, the respective outward end surfaces of the first light guide plate 20 are arranged so as to face the first LED units 23 (the LEDs 17), and these outward end surfaces are configured as light entering surfaces 20b through which light emitted from the LEDs 17 of the first LED units 24 enters. That is, the light entering surfaces 20b are composed of the outer-circumferential end surfaces of the first light guide plate 20, and are configured as surfaces substantially orthogonal to the light exiting surface 20a. There is a predetermined gap held between the light entering surfaces 20b and the first LED units 23, which makes it possible to allow thermal expansion of the first light guide plate 20 and to absorb errors generated at the time of assembly.

In contrast, the second light guide plate 21 is arranged between the two second LED units 24 of each of the two pairs that are arranged to face each other. The second light guide plate 21 is positioned on a back side (the side opposite to the light exiting surface 20a) of the first light guide plate 20 and is arranged such that the main plate surface thereof faces the first light guide plate 20. This main plate surface is a light exiting surface 21a through which light inside the second light guide plate 21 is outputted toward the first light guide plate 20. The light exiting surface 21a is a surface parallel to the light exiting surface 20a of the first light guide plate 20. The respective outward end surfaces of the second light guide plate 21 are arranged so as to face the second LED units 24 (the LEDs 17), and these outward end surfaces are configured as light entering surfaces 21b through which light emitted from the LEDs 17 of the second LED units 24 enters. That is, the light entering surfaces 21b are composed of the outer-circumferential end surfaces of the second light guide plate 21, and are configured as surfaces substantially orthogonal to the light exiting surface 21a. There is a predetermined gap held between the light entering surfaces 21b and the second LED units 24, which makes it possible to allow thermal expansion of the second light guide plate 21 and to absorb errors generated at the time of assembly.

The second light guide plate 21 is arranged in the substantially central portion of the first light guide plate 20 in a plan view. Specifically, the second light guide plate 21 is arranged in a position substantially concentrical with respect to the first light guide plate 20. Accordingly, the first light guide plate 20 is divided into an overlap region RA overlapping the second light guide plate 21 in a plan view and a non-overlap region NRA not overlapping the second light guide plate 21 in a plan view, and the non-overlap region NRA corresponds to an outer-circumferential end section in the first light guide plate 20 that has a frame-like shape and the overlap region RA corresponds to the central side section that corresponds to a section of the first light guide plate 20 other than outer-circumferential end section. Note that a shaded portion shown in FIG. 4 indicates the overlap region RA. This overlap region RA includes a farthest-located section F of the first light guide plate 20 (the central section including the center of the first light guide plate 20) that is farthest from the LEDs 17 of the respective first LED units 23. That is, the light exiting surface 21a of the second light guide plate 21 is arranged so as to overlap the farthest-located section F of the first light guide plate 20 in a plan view. Thus, light outputted from the light exiting surface 21a of the second light guide plate 21 is irradiated toward the overlap region RA including the farthest-located section F of the first light guide plate 20. The backward surface (the surface opposite to the light exiting surface 20a) of the first light guide plate 20 that faces the light exiting surface 21a of the second light guide plate 21 is configured as a second light entering surface 20c through which light outputted from the second light guide plate 21 enters. Here, the light quantity of each of the light guide plates 20 and 21 is inversely proportional to the distance from the LEDs 17, and tends to be lower as the distance from the LEDs 17 increases. Particularly the quantity of light existing inside the farthest-located section F is the lowest within the first light guide plate 20 sized larger than the second light guide plate 21. Accordingly, this embodiment makes it possible to cause the light outputted from the second light guide plate 21 to enter into the overlap region RA including the farthest-located section F, of the first light guide plate 20, where the light quantity is the lowest. This embodiment thereby makes it possible to supplement an insufficiency of the light quantity therein, and therefore can make unevenness unlikely to occur in light outputted from the first light guide plate 20.

On each of the backward surfaces (the surfaces opposite to the respective light exiting surfaces 20a and 21a) of the respective first and second light guide plates 20 and 21, a light reflecting section 27 formed in a dot pattern appearing in a white color is formed as shown in FIG. 4. The light reflecting section 27 is configured to reflect and scatter light simultaneously. Thus, light scattered and reflected by the light reflecting section 27 toward the light exiting surfaces 20a and 21a includes light (light not subject to total reflection) having the incidence angles with respect to the light exiting surfaces 20a and 21a that do not exceed critical angles. Accordingly, light is output from the light exiting surfaces 20a and 21a to the outside. The light reflecting section 27 is formed by arranging a number of dots 27a in a zigzag manner (in a zigzag alignment; in a staggered manner). Each of the dots 27a has a circular shape in a plan view. The dot patterns of the respective light reflecting sections 27 are formed as a first light reflecting section 27A on the first light guide plate 20 and a second light reflecting section 27B on the second light guide plate 21, for example. The dot patterns are formed by printing with paste containing a metal oxide on the surfaces of the light guide plates 20 and 21 that face the light exiting surfaces 20a and 21a. Screen-printing, ink jet printing or the like is preferred as means for the printing. The light reflecting section 27 is configured to have light reflectance of, for example, about 75% and to control, with the dot pattern varied across locations, directions toward which light is outputted from the light guide plates 20 and 21.

An area of each dot 27a of the light reflecting section 27 is larger as the distance from the LEDs 17 increases, that is, the dot 27a becomes larger toward the central section in each of the light guide plates 20 and 21. The function of scattering and reflecting light of the light reflecting section 27 is enhanced in proportion to the area thereof. As the function of scattering and reflecting light is enhanced, the quantity of light outputted from each of the light exiting surfaces 20a and 21a increases. Thus, the area of the light reflecting section 27 is set to increase as the distance from the LEDs 17 increases, light output is suppressed in parts relatively close to the LEDs 17 where the quantity of light present inside the light guide plates 20 and 21 is relatively high, and light output is suppressed in parts relatively far from the LEDs 17 where the quantity of light present inside the light guide plates 20 and 21 is relatively low. Accordingly, unevenness is unlikely to occur in the distribution of light outputted from the light exiting surfaces 20a and 21a. Note that, within the second light entering surface 20c configured as a surface on which the first light reflecting section 27A is placed in the first light guide plate 20, light outputted from the second light guide plate 21 enters through a part of the second light entering surface 20c that does not have the first light reflecting section 27A formed thereon.

Reflection sheets 22 are made of synthetic resin (e.g., made of foamed PET), and have the outer surfaces appearing in a white color excellent in light reflectance. The reflection sheets 22 are stuck to the backward surfaces of the light guide plates 20 and 21 with the light reflecting section 27 interposed therebetween. Light outputted from the rear side of the respective light guide plates 20 and 21 reflected back into the respective light guide plates 20 and 21 by the reflection sheets 22. The first reflection sheet 22A attached to the first light guide plate 20 has a rectangular frame-like shape in a plan view and is configured to have a width slightly wider than the non-overlap region NRA described already. Specifically, the first reflection sheet 22A is provided on an area ranging from a portion of the first light guide plate 20 that is placed on the receiving panel 14c of the chassis 15 (outer circumferential end portion) to a portion of the first light guide plate 20 overlapping the second LED unit 24 and the outer circumferential end portion of the second light guide plate 21 in a plan view. However, the first reflection sheet 22A is not provided in a portion of the first light guide plate 20 overlapping the main section (the central side section) of the light exiting surface 21a of the second light guide plate 21 in a plan view. This first reflection sheet 22A prevents direct light from the second LED units 24 from entering through the second light entering surfaces 20c and prevents shadows of the second LED units 24 from being cast on the first light guide plate 20. The first reflection sheet 22A also reflects light outputted toward the first reflection sheet 22A from inside the first light guide plate 20 that faces the first reflection sheet 22A back to the inside of the first light guide plate 20 again. The first reflection sheet 22A is formed in a frame-like shape to have an opening portion in the middle portion. This allows light outputted from the second light guide plate 21 to enter into the second light entering surfaces 20c.

On the other hand, the second reflection sheet 22B attached to the second light guide plate 21 has a rectangular shape sized substantially the same as the second light guide plate 21 in a plan view. This second reflection sheet 22B reflects light outputted from inside of the second light guide plate 21 toward the second reflection sheet 22B back to the inside of the second light guide plate 21 again.

The structure of the present embodiment is described above, and the operation and effect thereof are subsequently described. Firstly, the optical operation associated with the second light guide plate 21 is described. If the LEDs 17 in the second LED units 24 are turned on, light emitted by the LEDs 17 enters into the light entering surface 21b of the second light guide plate 21, and total reflection of the light are repeated within the second light guide plate 21 and the light is transmitted in an entire area of the second light guide plate 21. Out of this light, light that strikes the second light reflecting section 27B is scattered and reflected. Out of this scattered and reflected light, light that forms angles smaller than the critical angle exits from the light exiting surface 21a. Additionally, light emitted toward one surface of the second light guide plate 21 that is opposite to the light exiting surface 21a is reflected, by the second reflection sheet 22B, back into the inside of the second light guide plate 21, then transmitted through the second light guide plate 21. Thereafter, the light is again outputted from the light exiting surface 21a, thus being effectively utilized. Light outputted from the second light guide plate 21 enters through the second light entering surfaces 20c of the first light guide plate 20 through a dot non-formation section of the first light reflecting section 27A.

Next, the optical operation associated with the first light guide plate 20 is described. Light from the LEDs 17 enters the light entering surface 20b of the first light guide plate 20 when the LEDs 17 in the first LED units 23 are turned on. On the other hand, light outputted from the second light guide plate 21 enters the second light entering surface 20c of the first light guide plate 20. Light that enters into each of the above light entering surfaces repeats total reflection within the first light guide plate 20, and is transmitted in an entire area of the first light guide plate 20. Out of the light thus transmitted, light that strikes the first light reflecting section 27A is scattered and reflected. Out of this scattered and reflected light, light that forms angles smaller than the critical angle exits from the light exiting surface 20a. Additionally, light directed to a surface of the first light guide plate 20 opposite from the light exiting surface 20a in a portion of the first light guide plate 20 having the first reflection sheet 22A thereon is reflected by the first reflection sheet 22A and returned to the inside of the first light guide plate 20. In a portion of the first light guide plate 20 having no first light reflection sheet 22A, light outputted from a dot non-formation section of the first light reflecting section 27A toward the second light guide plate 21 is reflected by or enters through the second light exiting surface 21a of the second light guide plate 21.

Thus, this embodiment is configured such that not only the light emitted from the LEDs 17 of the first LED units 23 but also the light outputted from the second light guide plate 21 enter into the first light guide plate 20. The brightness of the light outputted from the first light guide plate 20 can be improved as much as supplementary light that enters therein from the second light guide plate 21. Additionally, because the second light guide plate 21 configured to supply light to the first light guide plate 20 is arranged so as to overlap a central side section (the overlap region RA) in the first light guide plate 20, i.e., a portion therein including the farthest-located section F, which is farthest from the LEDs 17 of the first LED units 23. It is thereby possible to provide supplementary light from the second light guide plate 21 intensively to the overlap region RA including the farthest-located section F, which tends to be short of internal light quantity. Particularly, since this overlap region RA corresponds to the central section of the display screen in the liquid crystal display device 10, improving the brightness of this central section of the display screen makes it possible to obtain favorable display quality.

Next, the brightness distribution of light outputted from the first light guide plate 20 is specifically described. Firstly, a dashed line 3 in FIG. 6 represents the brightness distribution of light outputted from the first light guide plate 20 in a case where only the light from the first LED units 23 is allowed to enter into the first light guide plate 20 and the light from the second light guide plate 21 is not allowed to do so. In this case, the distribution is such that the central side of the first light guide plate 20 in the short side direction thereof is lower in brightness than parts relatively close to the both end sides in the short side direction. This is because, with the first LED units 23 arranged in the outer-circumferential end section of the first light guide plate 20 as in the present embodiment, the farthest-located section F which is farthest therein from the light sources becomes the central section. This indicates that the brightness of the outputted light decreases as the distance from the LEDs 17 increases.

On the other hand, a dashed line 2 in FIG. 6 represents the brightness distribution of the light outputted from the second light guide plate 21 to supply light to the first light guide plate 20. The brightness of the light outputted from this second light guide plate 21 is less likely to show a fall in the central section because the light exiting surface 21a is a smaller area than the first light guide plate 20. Because the second light guide plate 21 is arranged so as to overlap the overlap region RA including the farthest-located section F in the first light guide plate 20, the brightness distribution of the light outputted from the second light guide plate 21 is superposed particularly with a part, of the above described brightness distribution (the dashed line 3 in FIG. 6) of the first light guide plate 20 alone, where there is a fall in brightness. Here, the brightness distribution of the first light guide plate 20 alone and the brightness distribution (the broken line 2 in FIG. 6) of the second light guide plate 21 are synthesized into the brightness distribution (represented by a solid line 1 in FIG. 6) of light outputted from the first light guide plate 20 under the influence of the supplementary light supplied from the second light guide plate 21. This brightness distribution has a peak of the brightness in the central section where there is a fall in brightness in the case where only the first light guide plate 20 is taken into consideration. This brightness distribution is a gently sloping distribution as a whole. Note that, although the horizontal axis of the graph in FIG. 6 represents the short side direction (the Y-axis direction) of the light exiting surface 20a of the first light guide plate 20, a similar brightness distribution is obtained in a case where the horizontal axis thereof represents the long side direction (the X-axis direction) of the light exiting surface 20a thereof.

Therefore, the brightness can be improved in the central section of the first light guide plate 20 and in the central section of the display screen in the liquid crystal display device 10 with light introduced into the central section, of the first light guide plate 20 including the farthest-located section F that tends to be short of light quantity, the light having been outputted from the second light guide plate 21.

Additionally, the reflection sheets 22 are arranged not only on the bottom panel 14a of the chassis 14 but also between the first light guide plate 20 and the second light guide plate 21, which makes it possible to guide much more light inside the first light guide plate 20 toward the light exiting surface 20a. Note that the first reflection sheet 22A arranged between this first light guide plate 20 and the second light guide plate 21 is arranged in a manner such as to cover the second LED units 24, and can thereby prevent unevenness in brightness on the light exiting surface 20a of the first light guide plate 20 from occurring due to, for example, casting of shadows of the second LED units 24 thereon.

Additionally, in this embodiment, the heat dissipation members 19 are arranged between the LED units 23 and 24 and the chassis 14. This enables heat dissipation from the LEDs 17 to the chassis 14 through the heat dissipation members 19 when the LEDs 17 is heated up after being turned on. Note that, in this embodiment, the second LED units 24 and the first LED units 23 are placed toward the second light guide plate 21 and toward the first light guide plate 20, respectively, in a dispersed manner, and heat dissipation members 19 are correspondingly arranged also in a dispersed manner. Thus, this embodiment makes it possible to improve heat dissipation efficiency in comparison with a case where only the first light guide plate 20 is used and the same number of the LEDs 17 (having the same heat dissipation capability) are arranged.

Second Embodiment

Figure 7:
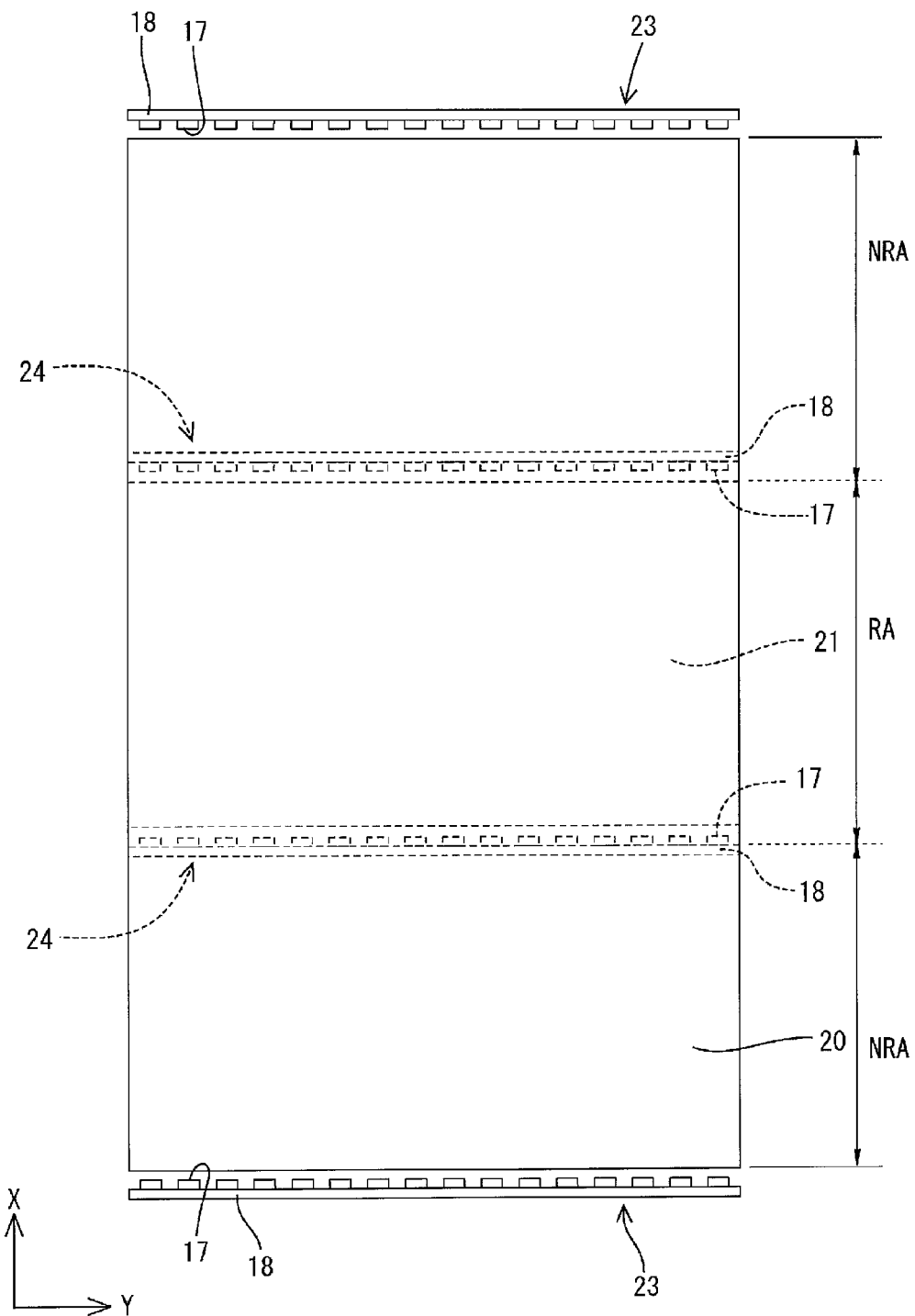
FIG. 7 is a plan view showing a layout of LEDs and light guide plates, which are included in a liquid crystal display device according to a second embodiment.

Next, the second embodiment of the present invention is described with reference to FIGS. 7 and 8. In this second embodiment, while the two first LED units 23 in a pair, and the two second LED units 24 in a pair are arranged only in positions sandwiching the respective light guide plates 20 and 21 along the X axis direction, the size of the first light guide plate 20 in the short side direction thereof is equal to the size of the second light guide plate 21 in the long side direction thereof. Other members similar to those in the first embodiment are denoted by the same reference signs, and illustration and description thereof are omitted. FIG. 7 is a plan view showing a layout of the LEDs 17 and the light guide plates 20 and 21, which are included in a liquid crystal display device according to this embodiment; and FIG. 8 is a cross-sectional view showing a sectional configuration of the liquid crystal display device 10 according to this embodiment, taken along the long side direction thereof.

The first light guide plate 20 is configured with the main plate surface thereof having the same area as in the first embodiment. On the other hand, as shown in FIG. 7, while the second light guide plate 21 is configured with the main plate surface thereof having a rectangular shape as in the first embodiment, the second light guide plate 21 is arranged with the long side direction thereof agreeing with the short side direction of the first light guide plate 20 and is configured with the long sides thereof sized about the same as the short sides of the first light guide plate 20. Further, the size of the short sides of the second light guide plate 21 is set to about one third of the size of the long sides of the first light guide plate 20. While one pair of the first LED units 23 is arranged toward the short side end surfaces of the first light guide plate 20, none of the first LED units 23 are arranged along the long side end surfaces thereof. Further, while one pair of the second LED units 24 is arranged toward the long side end surfaces of the second light guide plate 21, none of the second LED units 24 are arranged along the short side end surfaces thereof. As in the first embodiment, the second light guide plate 21 is arranged toward the backward side of the first light guide plate 20 with the light exiting surface 21b facing the second light entering surface 20c of the first light guide plate 20. Additionally, the second light guide plate 21 is positioned so as to overlap the central section of the first light guide plate 20 in the long side direction of the first light guide plate 20. Thus, as shown in FIGS. 7 and 8, in the first light guide plate 20, the central side section in the long side direction thereof, which includes a farthest-located section (not shown) that is farthest therein from the LEDs 17 constituting the first LED units 23, is configured as an overlap region RA overlapping the second light guide plate 21, whereas both end sections in the long side direction thereof are configured as a pair of non-overlap regions NRA not overlapping the second light guide plate 21. Note that the first LED units 23 and the second LED units 24 are configured so as to have optical axes equally oriented in the X-axis direction and being parallel to one another.

Figure 8:
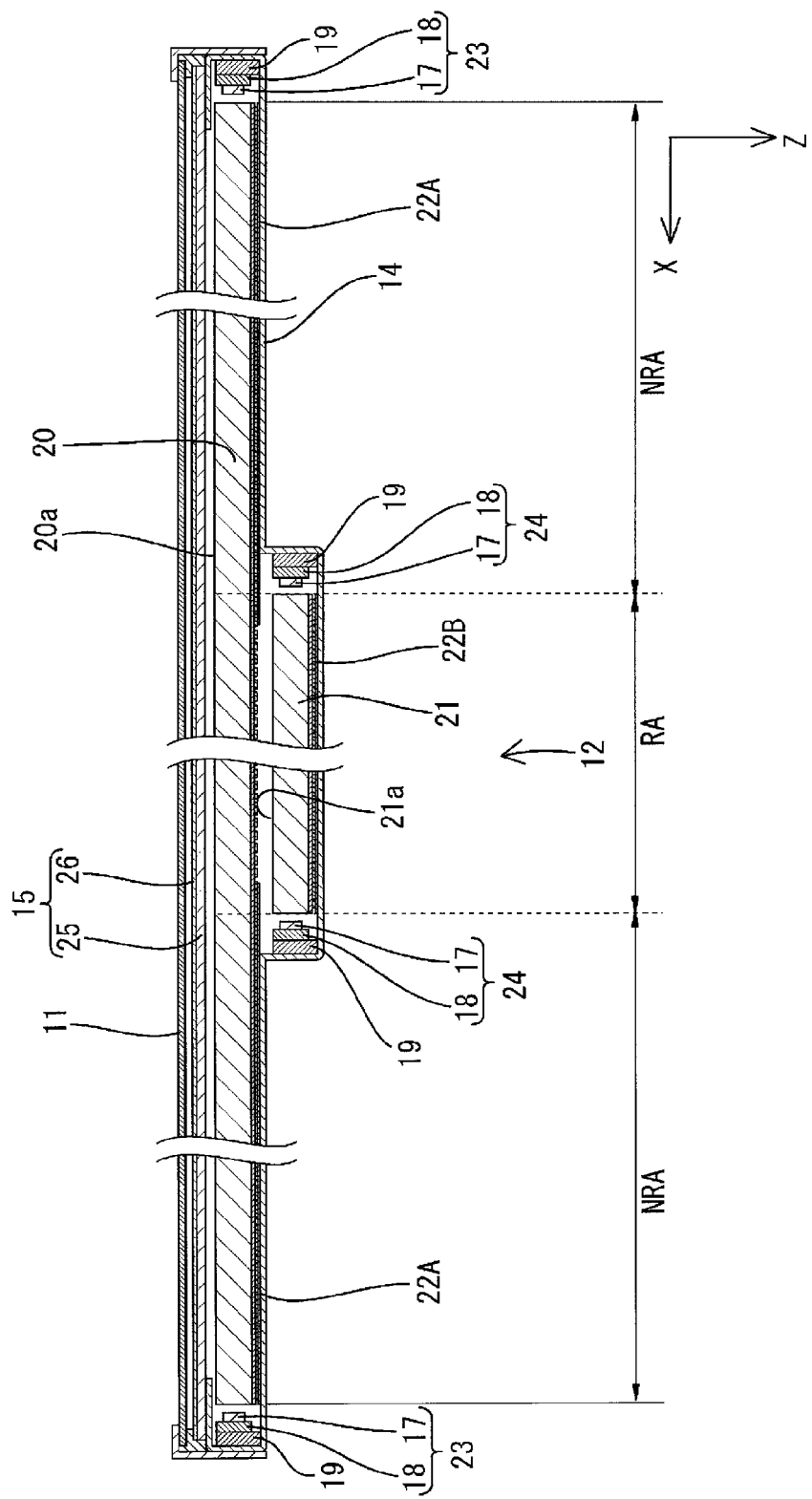
FIG. 8 is a cross-sectional view showing a sectional configuration of the liquid crystal display device according to the second embodiment taken along a long side direction thereof.

According to this structure, as shown in FIG. 8, the second light guide plate 21 is placed so as to overlap, in a direction orthogonal to the plate surfaces of the optical members 15, the central side section (the overlap region RA), within the first light guide plate 20, in the long side direction thereof, which includes the farthest-located section (not shown) that tends to be short of light quantity. This structure improves the brightness in the central side section in the long side direction. According to the placement of the first LED units 23 in this embodiment, the brightness of the first light guide plate 20 shows a fall, uniformly all along the short side direction (the Y-axis direction), in the substantially central section in the long side direction (the X-axis direction). By contrast, the second light guide plate 21 is arranged to cover, from end to end in the short side direction (the Y-axis direction), the substantially central section of the first light guide plate 20 in the long side direction. It is thereby possible to improve, all along the short side direction, the brightness in the central section of the first light guide plate 20 in the long side direction. The placement in this manner eliminates the need to install the LED units 23 and 24 on long side sections of the first light guide plate 20 and on short side sections of the second light guide plate 21, and thereby reduces cost and number of components.

While the second embodiment of the present invention is shown above, the present invention is not limited thereto and may include, for example, the following modifications. Note that, in each of the following modifications, members similar to those in the above embodiments are denoted by the same reference signs, and illustration and description thereof are omitted.

First Modification of Second Embodiment

A first modification of the second embodiment is described with reference to FIGS. 9 and 10. Herein shown is a modification obtained by modifying the placement of the first LED units 23 with respect to the first light guide plate 20 and the placement of the second LED units 24 with respect to the second light guide plate 21, and further modifying the placement of the second light guide plate 21 with respect to the first light guide plate 20.

FIG. 9 is a plan view showing a layout of the LEDs 17 and the light guide plates 20 and 21, which are included in a liquid crystal display device according to this modification; and FIG. 10 is a cross-sectional view showing a sectional configuration of the liquid crystal display device 10 according to this modification, taken along the long side direction thereof.

The first light guide plate 20 is configured with the main plate surface thereof having about the same area as in the first embodiment. On the other hand, as shown in FIG. 9, the second light guide plate 21 is configured with the main plate surface thereof having a rectangular shape as in the first embodiment, is arranged with the long side direction thereof agreeing with the long side direction of the first light guide plate 20, and is configured with the long sides thereof sized the same as the long sides of the first light guide plate 20. Further, the size of the short sides of the second light guide plate 21 is set to about one third of the size of the short sides of the first light guide plate 20. One pair of the first LED units 23 is arranged such that they face only the long side end surfaces of the first light guide plate 20. Further, one pair of the second LED units 24 is arranged such that they face only the long side end surfaces of the second light guide plate 21. As in the first and second embodiments, the second light guide plate 21 is arranged toward the backward side of the first light guide plate 20 with the light exiting surface 20a facing the second light entering surface 20c of the first light guide plate 20. Additionally, the second light guide plate 21 is positioned so as to overlap the central section of the first light guide plate 20 in the short side direction of the first light guide plate 20. Thus, a central side section of the first light guide plate 20 in the short side direction thereof is configured as an overlap region RA overlapping the second light guide plate 21. The central side section of the first light guide plate 20 includes the farthest-located section (not shown) that is farthest therein from the LEDs 17 of the first LED units 23. Both end sections of the first light guide plate 20 in the short side direction thereof are configured as a pair of non-overlap regions NRA not overlapping the second light guide plate 21. The first LED units 23 and the second LED units 24 are configured to have optical axes equally oriented in the Y-axis direction and being parallel to one another.

According to this structure, as shown in FIG. 9, the second light guide plate 21 is placed so as to overlap the central side section (the overlap region RA) of the first light guide plate 20 in a direction orthogonal to the plate surfaces of the optical members 15. The central side section is located on the first light guide plate 20 in the short side direction and includes the farthest-located section (not shown) that tends to be short of light quantity. This structure improves the brightness in the central side section in the short side direction. According to the placement of the first LED units 23 in this modification, the brightness of the first light guide plate 20 shows a fall, uniformly all along the long side direction (the X-axis direction), in the substantially central section in the short side direction (the Y-axis direction). In response, the second light guide plate 21 is arranged to cover, from end to end in the long side direction (the X-axis direction), the substantially central section of the first light guide plate 20 in the short side direction. It is thereby possible to improve, all along the long side direction, the brightness from the central section of the first light guide plate 20 in the short side direction. The placement in this manner eliminates the need to install the LED units 23 and 24 on short side sections of the first light guide plate 20 and the second light guide plate 21, and thereby reduces cost and number of components.

Other Embodiment

The present invention is not limited to the above embodiments explained in the above description and drawings. The following embodiments may be included in the technical scope of the present invention, for example.

(1) A lens sheet having the light condensing function may be arranged between the first light guide plate 20 and the second light guide plate 21. This configuration enables light outputted from the second light guide plate 21 to enter into the first light guide plate 20 after being condensed by the lens sheet, and thereby makes it possible to further improve the brightness in the central part of the display screen.

(2) Apart from the above described embodiments, the placement of the second light guide plate 21 with respect to the first light guide plate 20 may be changed as appropriate. Specifically, it is not always necessary to place the second light guide plate 21 concentrically with respect to the first light guide plate 20, and the second light guide plate 21 may be positioned eccentrically with respect to the first light guide plate 20.

(3) Apart from the above described embodiments, the shapes of the first light guide plate 20 and the second light guide plate 21 may be changed as appropriate. Specifically, either or both of the light guide plates 20 and 21 may be configured in a square shape, a circular shape or an oval shape in a plan view. The ratio of the sizes of the first light guide plate 20 and the second light guide plate 21 also may be changed as appropriate.

(4) Each of the above described embodiments shows a case where the dots 27a configured to scatter and reflect light are provided as the light reflecting section 27. However, for example, another configuration may be used where an indented section or a rough surface, having a predetermined pattern, is formed on each of surfaces of the light guide plates 20 and 21 that are opposite to the light exiting surfaces 20a and 21a. With this configuration, light having hit that surface is scattered, and exiting of the light from the light exiting surfaces 20a and 21a is facilitated.

(5) Although the LEDs 17 are used as the light sources in the above described embodiments, the present invention is not limited thereto. A discharge tube (a linear light source; a tubular light source) such as a cold cathode tube or a hot cathode tube may be used. Additionally, the present invention also includes a case where two or more kinds of light sources are used in combination.

(6) In the above-described embodiments, each of the dots 27a in the dot pattern constituting the light reflecting section 27 is configured in a round shape. However, the shape of the dot 27a is not limited thereto, and an arbitrary shape such as an oval shape or a polygonal shape may be selected as the shape thereof.

(7) In each of the above described embodiments, the light reflecting section 27 is formed on each of the backward surfaces of the light guide plates 20 and 21 by printing. However, the present invention also includes, for example, a case using other formation means such as metal vapor deposition.

(8) In each of the above-described embodiments, the light reflectance is designed and controlled by varying the areas of the respective dots 27a constituting the light reflecting section 27. However, the present invention also includes, for example, a case where the dots 27 having the same area and placed at various intervals or the dots 27a formed with light reflectance varied thereamong are used as means for controlling the light reflectance. In this case, the dots 27a having light reflectance varied thereamong are formed, for example, by using two or more materials different in light reflectance.

(9) Each of the above-described embodiments shows a case where the light reflecting sections 27 are formed on the respective light guide plates 20 and 21. However, the present invention also includes a case where the light reflecting sections 27 are formed on other members and are stuck to or placed over surfaces of the light guide plates 20 and 21 that face the light exiting surfaces 20a and 21a.

(10) Apart from the above-described embodiments, the numbers and kinds of the diffuser plates 25 and the optical sheets 26, which are used as the optical member 15, may be changed as appropriate.

(11) Apart from the above-described embodiments, the screen size, the aspect ratio and the like of the liquid crystal display device 10 may be changed as appropriate. For example, the liquid crystal display device 10 (the chassis 14 and the like) may be configured in a square shape in a plan view.

(12) Each of the above described embodiments shows, as an example, a case where the liquid crystal panel 11 and the chassis 14 are set in the stand-up state with their short side directions agreeing with the vertical direction. However, the present invention also includes a case where the liquid crystal panel 11 and the chassis 14 are set in the stand-up state with their long side directions agreeing with the vertical direction.

(13) Each of the above-described embodiments uses TFTs as switching elements of the liquid crystal display device 10. However, the present invention is applicable also to a liquid crystal display device using switching elements (e.g., thin-film diodes (TFDs)) other than TFTs, and further applicable not only to liquid crystal display devices providing color display but also to liquid crystal display devices providing monochrome display.

(14) Each of the above described embodiments shows, as an example, the liquid crystal display device 10 using the liquid crystal panel 11 as a display panel. However, the present invention is applicable also to a display device using a display panel of another type.

(15) Each of the above described embodiments shows, as an example, the television receiver including a tuner. However, the present invention is applicable also to a display device which does not include a tuner.

The invention claimed is:

1. A lighting device comprising:
a first light source;
a first light guide member including a light entering surface through which light emitted from the first light source enters, and a light exiting surface through which the light exits;
a second light source;
a second light guide member including a light entering surface through which light emitted from the second light source enters, and a light exiting surface through which the light exits;
a first reflection member configured to reflect light emitted from the first light source toward the light exiting surface of the first light guide member; and
a second reflection member configured to reflect light emitted from the second light source toward the light exiting surface of the second light guide member, wherein:
the light exiting surface of the second light guide member is disposed to overlap at least a portion of the light existing surface of the first light guide member that is farthest from the first light source; and
light outputted from the light exiting surface of the second light guide member enters the first light guide member at least from a surface of the first light guide member that is opposite to the light exiting surface thereof;
the first reflection member is arranged on the first light guide member substantially so as not to overlap the light exiting surface of the second light guide member; and
the first reflection member is arranged to cover at least the second light source, and is arranged on a side of the second light source close to the first light guide member.

2. The lighting device according to claim 1, wherein:
the first light guide member is formed in a plate-like shape and has an end surface, and the first light source is arranged to face the end surface of the first light guide member; and
the second light guide member is formed in a plate-like shape and has an end surface, and the second light source is arranged to face the end surface of the second light guide member.

3. The lighting device according to claim 1, wherein:
each of the first light guide member and the second light guide member is formed in a quadrangular shape; and
the first light source includes at least two first light sources and the second light source includes at least two second light sources, and the at least two first light sources are provided close to opposite ends of the first light guide member respectively and the at least two second light sources are provided close to opposite ends of the second light guide member respectively.

4. The lighting device according to claim 1, wherein the first light source is provided to correspond to each side of the first light guide member and the second light source is provided to correspond to each side of the first light guide member.

5. The lighting device according to claim 1, further comprising a lens sheet arranged on a side close to the light exiting surface of the second light guide member.

6. The lighting device according to claim 1, further comprising a light reflecting portion on a surface of the first light guide member and/or the second light guide member that is opposite to the light exiting surface of the first light guide member and/or the second light guide member, the light reflecting portion is configured to cause a distribution of light reflectance within a surface area of the surface having the light reflecting portion.

7. The lighting device according to claim 6, wherein the light reflecting portion includes a number of dots formed in a substantially point-like shape and having a light reflectivity.

8. The lighting device according to claim 1, further comprising:
- a chassis housing the first light source, the first light guide member, the second light source, and the second light guide member; and
- a heat transfer member provided between the first light source and the chassis and between the second light source and the chassis, the heat transfer member transferring heat between the first light source and the chassis and between the second light source and the chassis.

9. A display device comprising:
the lighting device according to claim 1; and
a display panel configured to provide display by using light emitted from the lighting device.

10. The display device according to claim 9, wherein the display panel is a liquid crystal panel obtained by enclosing liquid crystal between a pair of substrates.

11. A television receiver comprising the display device according to claim 9.

* * * * *